United States Patent [19]

Ishizuka

[11] Patent Number: 5,953,711
[45] Date of Patent: Sep. 14, 1999

[54] PRODUCTION SCHEDULING METHOD AND PRODUCTION SCHEDULING APPARATUS

[75] Inventor: Hiroaki Ishizuka, Osaka, Japan

[73] Assignee: Matsushita Electric Industrial Co., Ltd., Japan

[21] Appl. No.: 08/820,217

[22] Filed: Mar. 18, 1997

[30] Foreign Application Priority Data

Mar. 19, 1996 [JP] Japan ................................. 8-062371

[51] Int. Cl.$^6$ ................................................. G06F 19/00
[52] U.S. Cl. ................ 705/400; 364/468.06; 364/468.07
[58] Field of Search ................................. 705/400, 401, 705/7; 377/13, 15, 16, 19, 20; 364/468.06, 468.07, 468.08

[56] References Cited

U.S. PATENT DOCUMENTS 5,706,200   1/1998   Kumar et al. ........................ 364/468.06
5,801,945   9/1998   Comer ................................. 364/468.06

FOREIGN PATENT DOCUMENTS 63-236307   10/1988   Japan .

*Primary Examiner*—Emanuel Todd Voeltz
*Assistant Examiner*—Thomas Dixon
*Attorney, Agent, or Firm*—McDermott, Will & Emery

[57] ABSTRACT

At a first step, there is retrieved, out of the products placed in the production line, each product for which the $j_n(i)$th process of each product i, i.e., each process $P(i, j_n(i))$, has not yet been executed but for which each process $P(i, j_n(i)-1)$ serving as the previous process of each process $P(i, j_n(i))$, has been executed. At a second step, (i) there are retrieved, for each product retrieved at the first step, one or more processable processes each of which can be executed subsequent to each process $P(i, j_n(i)-1)$, (ii) there are also calculated the sum totals of the production costs of the products i or the sum totals of the delivery delay terms of the products i at the time when one or more processes out of the retrieved one or more processable processes are executed subsequent to the process $P(i, j_n(i)-1)$, (iii) and there are selected, as one or more subsequent processes, the one or more processable processes corresponding to the smallest sum total of the production costs of the products i or to the smallest sum total of the delivery delay terms of the products i. At a third step, there is prepared a production program for executing, subsequent to each process $P(i, j_n(i)-1)$, each of the one or more processable processes selected by the second step.

18 Claims, 6 Drawing Sheets

FIG. 3

PROCESSABLE PROCESS STORING TABLE

| PROCESS $P(i, jn(i)-1)$ | PROCESSABLE PROCESS $P(i, jp(i))$ |
|---|---|
| CLEANING PROCESS A | ALL PROCESS |
| CLEANING PROCESS B | CLEANING PROCESS A, CLEANING PROCESS B, DRY ETCHING PROCESS, CVD PROCESS |
| DRY ETCHING PROCESS | CLEANING PROCESS A |
| ... | ... |
| | |
| | |
| | |

PRODUCTION SCHEDULING METHOD AND PRODUCTION SCHEDULING APPARATUS

BACKGROUND OF THE INVENTION

The present invention relates to a production scheduling method of and a production scheduling apparatus for planning a production program of products.

The following will discuss a production scheduling method of prior art. It is now supposed that the number of different products is defined as A, the name of each product is defined as i and the number of processes to be executed for producing each product i is defined as N(i) (which varies with the type of each product i). According to a production scheduling method of prior art, there is prepared a production program in which after the jth process of each product i, i.e., each process P(i,j) (i=1, . . . , A, j=1, . . . , N(i)−1) has been finished, each subsequent process P(i, j+1) of each product i is executed.

The production program prepared by the production scheduling method of prior art, is arranged to instruct to execute invariably each subsequent process P(i, j+1) after completion of each process P(i,j). Accordingly, even though a defect has been found on a product i as a result of the inspection conducted after completion of the process P(i,j), the subsequent process P(i, j+1) is executed on the product i. This disadvantageously lowers the production yield, thus increasing the production cost.

According to the production scheduling method of prior art, the production cost of each product, the delivery delay term of each product, each system standby term and the like are not taken into consideration. This disadvantageously produces an increase in production cost, a delay in delivery term and an increase in system standby term.

BACKGROUND OF THE INVENTION

In view of the foregoing, it is an object of the present invention to make provision such that there is prepared a production program improved not only in production yield but also in production cost, delivery term, system standby term and the like.

A first production scheduling method according to the present invention comprises: a product-to-be-processed retrieval step of retrieving, out of the products placed in the production line, each product for which the $j_n(i)$th process of each product i, i.e., each process $P(i, j_n(i))$, has not yet been executed but for which each process $P(i, j_n(i)-1)$ serving as the previous process of each process $P(i, j_n(i))$ has been executed; a subsequent-process selection step of (i) retrieving, for each product retrieved at the product-to-be-processed retrieval step, one or more processable processes each of which can be executed subsequent to each process $P(i, j_n(i)-1)$, (ii) calculating parameters at the time when there are executed, subsequent to the process $P(i,j_n(i)-1)$, one or more processes out of the retrieved one or more processable processes, each of the parameters comprising at least one sum total selected from the group consisting of the sum total of the production costs of the products i and the sum total of the delivery delay terms of the products i, and (iii) selecting, as one or more subsequent processes, the one or more processable processes corresponding to the optimum parameter out of the calculated parameters; and a production program preparing step of preparing a production program for executing, subsequent to each process $P(i, j_n(i)-1)$, each of the one or more processable processes selected by the subsequent-process selection step.

According to the first production scheduling method, before the $j_n(i)$th process of each product i, i.e., each process $P(i, j_n(i))$, is executed, there is retrieved each product for which each process $P(i,j_n(i))$ has not yet been executed but for which each process $P(i, j_n(i)-1)$ serving as the previous process of each process $P(i, j_n(i))$, has been executed, and there are retrieved, for each retrieved product waiting for a process, one or more processable processes each of which can be executed subsequent to the process $P(i, j_n(i)-1)$. It is therefore possible to avoid the execution of the process $P(i, j_n(i))$ on a product which has been judged, as a result of an inspection, that it is not preferred to execute the process $P(i, j_n(i))$. This improves the yield, thus reducing the production cost.

At the subsequent-process selection step, there are calculated parameters each comprising at least one sum total selected from the group consisting of the sum total of the production costs of the products i and the sum total of the delivery delay terms of the products i, and there is prepared a production program for executing, out of the processable processes, the processable processes corresponding to the optimum parameter. Accordingly, the production program thus prepared is improved in parameter calculated at the subsequent-process selection step. This advantageously not only lowers the production costs of the products but also reduces the delivery delay terms of the products.

In the first production scheduling method, the subsequent-process selection step preferably comprises the steps of: retrieving, for each product retrieved at the product-to-be-processed retrieval step, one or more processable processes each of which can be executed subsequent to each process $P(i, j_n(i)-1)$; calculating the production cost of each product i when each of the retrieved one or more processable processes is executed subsequent to the process $P(i, j_n(i)-1)$; calculating, for each sum total of the production costs of the products i thus calculated, an evaluation function using the following formula $$(\text{Evaluation Function}) = \alpha * \sum_{i=1}^{A} (\text{Production Cost of Product } i)$$

wherein $\alpha$ is a constant and A is the number of different products.

and selecting, as one or more subsequent processes, the one or more processable processes corresponding to the smallest evaluation function out of the calculated evaluation functions.

Thus, when each evaluation function is calculated based on the production costs of the products i, there can be planned a production program lowered in production cost.

In the first production scheduling method, the subsequent-process selection step preferably comprises the steps of: retrieving, for each product retrieved at the product-to-be-processed retrieval step, one or more processable processes each of which can be executed subsequent to each process $P(i, j_n(i)-1)$; calculating the delivery delay term of each product i when each of the retrieved one or more processable processes is executed subsequent to the process $P(i, j_n(i)-1)$; calculating, for each sum total of the delivery delay terms of the products i thus calculated, an evaluation function using the following formula $$\text{(Evaluation Function)} = \beta * \sum_{i=1}^{A} \text{(Delivery Delay Term of Product } i\text{)}$$

wherein $\beta$ is a constant and $A$ is the number of different products.

and selecting, as one or more subsequent processes, the one or more processable processes corresponding to the smallest evaluation function out of the calculated evaluation functions.

Thus, when each evaluation function is calculated based on the delivery delay terms of the products i, there can be planned a production program reduced in delay of delivery term.

In the first production scheduling method, the subsequent-process selection step preferably comprises the steps of: retrieving, for each product retrieved at the product-to-be-processed retrieval step, one or more processable processes each of which can be executed subsequent to each process $P(i, j_n(i)-1)$; calculating the sum totals of the production costs of the products i and the sum totals of the delivery delay terms of the products i at the time when there are executed, subsequent to the process $P(i, j_n(i)-1)$, one or more processes out of the retrieved one or more processable processes; calculating, for each sum of production costs and delivery terms of the products i thus calculated, an evaluation function using the following formula $$\text{(Evaluation Function)} = \alpha * \sum_{i=1}^{A} \text{(Production Cost of Product } i\text{)} +$$

$$\beta * \sum_{i=1}^{A} \text{(Delivery Delay Term of Product } i\text{)}$$

wherein each of $\alpha$ and $\beta$ is a constant and $A$ is the number of different products.

and selecting, as one or more subsequent processes, the one or more processable processes corresponding to the smallest evaluation function out of the calculated evaluation functions.

Thus, when each evaluation function is calculated based on the production costs of the products i and the delivery delay terms of the products i, there can be planned a production program not only lowered in production cost but also reduced in delivery delay term.

A second production scheduling method according to the present invention comprises: a product-to-be-processed retrieval step of retrieving, out of the products placed in the production line, each product for which the $j_n(i)$th process of each product i, i.e., each process $P(i, j_n(i))$, has not yet been executed but for which each process $P(i, j_n(i)-1)$ serving as the previous process of each process $P(i, j_n(i))$, has been executed; a processable-process retrieval step of retrieving, for each product retrieved at the product-to-be-processed retrieval step, one or more processable processes each of which can be executed subsequent to the process $P(i, j_n(i)-1)$; a production program proposal preparing step of preparing one or more production program proposals in each of which one or more processes out of the one or more processable processes retrieved at the processable-process retrieval step are to be executed; and a production program proposal selection step of (i) calculating, for each of the one or more production program proposals prepared at the production program proposal preparing step, a parameter comprising at least one sum total selected from the group consisting of the sum total of the production costs of the products i, the sum total of the delivery delay terms of the products i and the sum total of the system standby terms, and (ii) selecting, as the production program, the production program proposal corresponding to the optimum parameter out of the calculated parameters.

According to the second production scheduling method, before the $j_n(i)$th process of each product i, i.e., each process $P(i, j_n(i))$, is executed, there is retrieved each product for which each process $P(i,j_n(i))$ has not yet been executed but for which each process $P(i, j_n(i)-1)$ serving as the previous process of each process $P(i, j_n(i))$, has been executed, and there are retrieved, for each retrieved product, one or more processable processes each of which can be executed subsequent to the process $P(i, j_n(i)-1)$. It is therefore possible to avoid the execution of the process $P(i, j_n(i))$ on a product which has been judged, as a result of an inspection, that it is not preferred to execute the process $P(i, j_n(i))$. This improves the yield, thus reducing the production cost.

For each product waiting for a process, there are retrieved one or more processable processes each of which can be executed subsequent to the process $P(i,j_n(i)-1)$, and there are prepared one or more production program proposals in each of which one or more processable processes out of the retrieved one or more processable processes are to be executed. Then, there is calculated, for each production program proposal, a parameter comprising at least one sum total selected from the group consisting of the sum total of the production costs of the products i, the sum total of the delivery delay terms of the products i and the sum total of the system standby terms. Then, there is selected, out of the production program proposals, the production program corresponding to the optimum parameter. This advantageously not only lowers the production costs of the products, but also reduces the delivery delay terms of the products, the system standby term or the like.

According to the second production scheduling method, the production program proposal selection step preferably comprises the steps of: calculating, for each of the one or more production program proposals prepared at the production program proposal preparing step, the production cost of each product i; calculating, for each sum total of the production costs of the products i thus calculated, an evaluation function using the following formula $$\text{(Evaluation Function)} = \alpha * \sum_{i=1}^{A} \text{(Production Cost of Product } i\text{)}$$

wherein $\alpha$ is a constant and $A$ is the number of different products.

and selecting, as the production program, the production program proposal corresponding to the smallest evaluation function out of the calculated evaluation functions.

Thus, when each evaluation function is calculated based on the production costs of the products i, there can be prepared a production program lowered in production cost.

According to the second production scheduling method, the production program proposal selection step preferably comprises the steps of: calculating, for each of the one or more production program proposals prepared at the production program proposal preparing step, the delivery delay term of each product i; calculating, for each sum total of the delivery terms of the products i thus calculated, an evaluation function using the following formula $$(\text{Evaluation Function}) = \beta * \sum_{i=1}^{A} (\text{Delivery Delay Term of Product } i)$$

wherein $\beta$ is a constant and $A$ is the number of different products.

and selecting, as the production program, the production program proposal corresponding to the smallest evaluation function out of the calculated evaluation functions.

Thus, when each evaluation function is calculated based on the delivery delay terms of the products i, there can be prepared a production program reduced in delivery delay.

According to the second production scheduling method, the production program proposal selection step preferably comprises the steps of: calculating, for each of the one or more production program proposals prepared at the production program proposal preparing step, the production cost of each product i and the delivery delay term of each product i; calculating, for each sum total of the production costs and delivery terms of the products i thus calculated, an evaluation function using the following formula $$(\text{Evaluation Function}) = \alpha * \sum_{i=1}^{A} (\text{Production Cost of Product } i) +$$

$$\beta * \sum_{i=1}^{A} (\text{Delivery Delay Term of Product } i)$$

wherein each of $\alpha$ and $\beta$ is a constant and $A$ is the number of different products.

and selecting, as the production program, the production program proposal corresponding to the smallest evaluation function out of the calculated evaluation functions.

Thus, when each evaluation function is calculated based on the production costs and delivery delay terms of the products i, there can be prepared a production program lowered in production cost and reduced in delivery delay.

According to the second production scheduling method, the production program proposal selection step preferably comprises the steps of: calculating, for each of the one or more production program proposals prepared at the production program proposal preparing step, the production cost of each product i, the delivery delay term of each product i and the sum of the system standby terms; calculating, for each sum total of the production costs of the products i, the delivery terms of the products i and the sum of the system standby terms thus calculated, an evaluation function using the following formula $$(\text{Evaluation Function}) = \alpha * \sum_{i=1}^{A} (\text{Production Cost of Product } i) +$$

$$\beta * \sum_{i=1}^{A} (\text{Delivery Delay Term of Product } i) +$$

$$\gamma * (\text{Sum Total of System Standby Terms})$$

wherein each of $\alpha$, $\beta$ and $\gamma$ is a constant and $A$ is the number of different products.

and selecting, as the production program, the production program proposal corresponding to the smallest evaluation function out of the calculated evaluation functions.

Thus, when each evaluation function is calculated based on the production costs and delivery delay terms of the products i and the sum of the system standby terms, there can be prepared a production program not only lowered in production cost but also reduced in delivery delay and the sum of the system standby terms.

A first production scheduling apparatus according to the present invention comprises: product-to-be-processed retrieval means for retrieving, out of the products placed in the production line, each product for which the $j_n(i)$th process of each product i, i.e., each process $P(i, j_n(i))$, has not yet been executed but for which each process $P(i, j_n(i)-1)$ serving as the previous process of each process $P(i, j_n(i))$, has been executed; processable-process retrieval means for retrieving, for each product retrieved by the product-to-be-processed retrieval means, one or more processable processes each of which can be executed subsequent to the process $P(i, j_n(i)-1)$; parameter calculation means for calculating parameters at the time when there are executed, subsequent to the process $P(i, j_n(i)-1)$, one or more processes out of the one or more processable processes retrieved by the processable-process retrieval means, each of the parameters comprising at least one sum total selected from the group consisting of the sum total of the production costs of the products i and the sum total of the delivery delay terms of the products i; subsequent-process selection means for selecting, as one or more subsequent processes, the one or more processable processes corresponding to the optimum parameter out of the parameters calculated by the parameter calculation means; and production program preparing means for preparing a production program for executing, subsequent to each process $P(i, j_n(i)-1)$, each of the one or more processable processes selected by the subsequent-process selection means.

According to the first production scheduling apparatus, before the $j_n(i)$th process of each product i, i.e., each process $P(i, j_n(i))$, is executed, there is retrieved each product for which each process $P(i, j_n(i))$ has not yet been executed but for which each process $P(i, j_n(i)-1)$ serving as the previous process of each process $P(i, j_n(i))$, has been executed, and there are retrieved, for each retrieved product, one or more processable processes each of which can be executed subsequent to the process $P(i, j_n(i)-1)$. It is therefore possible to avoid the execution of the process $P(i, j_n(i))$ on a product which has been judged, as a result of an inspection, that it is not preferred to execute the process $P(i, j_n(i))$. This improves the yield.

At the subsequent-process selection means, there are calculated parameters each comprising at least one sum total selected from the group consisting of the sum total of the production costs of the products i and the sum total of the delivery delay terms of the products i, and there is prepared a production program for executing, out of the processable processes, the processable processes corresponding to the optimum parameter. Accordingly, there can be planned a production program improved in parameter calculated at the subsequent-process selection step. This advantageously not only lowers the production cost but also reduces the delivery delay.

In the first production scheduling apparatus, the parameter calculation means preferably comprises means for calculating the production cost of each product i when each of the one or more processable processes retrieved by the processable-process retrieval means is executed subsequent to each process $P(i, j_n(i)-1)$; and the subsequent-process selection means preferably comprises means for calculating, for each sum total of the production costs of the products i thus calculated, an evaluation function using the following formula $$(\text{Evaluation Function}) = \alpha * \sum_{i=1}^{A} (\text{Production Cost of Product } i)$$

wherein $\alpha$ is a constant and $A$ is the number of different products.

and for selecting, as one or more subsequent processes, the one or more processable processes corresponding to the smallest evaluation function out of the calculated evaluation functions. With the arrangement above-mentioned, there can be planned a production program lowered in production cost.

In the first production scheduling apparatus, the parameter calculation means preferably comprises means for calculating the delivery delay term of each product i at the time when each of the one or more processable processes retrieved by the processable-process retrieval means is executed subsequent to each process $P(i, j_n(i)-1)$; and the subsequent-process selection means preferably comprises means for calculating, for each sum total of the delivery delay terms of the products i thus calculated, an evaluation function using the following formula $$(\text{Evaluation Function}) = \beta * \sum_{i=1}^{A} (\text{Delivery Delay Term of Product } i)$$

wherein $\beta$ is a constant and $A$ is the number of different products.

and for selecting, as one or more subsequent processes, the one or more processable processes corresponding to the smallest evaluation function out of the calculated evaluation functions. With the arrangement above-mentioned, there can be prepared a production program reduced in delivery delay.

In the first production scheduling apparatus, the parameter calculation means preferably comprises means for calculating the production cost of each product i and the delivery delay term of each product i at the time when there is executed, subsequent to each process $P(i, j_n(i)-1)$, each of the one or more processable processes retrieved by the processable-process retrieval means; and the subsequent-process selection means preferably comprises means for calculating, for each sum total of the production costs and delivery delay terms of the products i thus calculated, an evaluation function using the following formula $$(\text{Evaluation Function}) = \alpha * \sum_{i=1}^{A} (\text{Production Cost of Product } i) +$$

$$\beta * \sum_{i=1}^{A} (\text{Delivery Delay Term of Product } i)$$

wherein each of $\alpha$ and $\beta$ is a constant
and $A$ is the number of different products.

and for selecting, as one or more subsequent processes, the one or more processable processes corresponding to the smallest evaluation function out of the calculated evaluation functions. With the arrangement above-mentioned, there can be prepared a production cost lowered in production cost and reduced in delivery delay.

A second production scheduling apparatus according to the present invention comprises: product-to-be-processed retrieval means for retrieving, out of the products placed in the production line, each product for which the $j_n(i)$th process of each product i, i.e., each process $P(i, j_n(i))$, has not yet been executed but for which each process $P(i, j_n(i)-1)$ serving as the previous process of each process $P(i, j_n(i))$, has been executed; processable-process retrieval means for retrieving, for each product retrieved by the product-to-be-processed retrieval means, one or more processable processes each of which can be executed subsequent to each process $P(i, j_n(i)-1)$; production program proposal preparing means for preparing one or more production program proposals in each of which one or more processes out of the one or more processable processes retrieved by the processable-process retrieval means are to be executed; parameter calculation means for calculating, for each of the one or more production program proposals prepared by the production program proposal preparing means, a parameter comprising at least one sum total selected from the group consisting of the sum total of the production costs of the products i, the sum total of the delivery delay terms of the products i and the sum total of the system standby terms; and production program proposal selection means for selecting, as the production program, the production program proposal corresponding to the optimum parameter out of the parameters calculated by the parameter calculation means.

According to the second production scheduling apparatus, before the $j_n(i)$th process of each product i, i.e., each process $P(i, j_n(i))$, is executed, there is retrieved each product for which each process $P(i, j_n(i))$ has not yet been executed but for which each process $P(i, j_n(i)-1)$ serving as the previous process of each process $P(i, j_n(i))$, has been executed, and there are retrieved, for each retrieved product, one or more processable processes each of which can be executed subsequent to the process $P(i, j_n(i)-1)$. It is therefore possible to avoid the execution of the process $P(i, j_n(i))$ on a product which has been judged, as a result of an inspection, that it is not preferred to execute the process $P(i, j_n(i))$. This improves the yield.

For each product waiting for a process, there are retrieved one or more processable processes each of which can be executed subsequent to each process $P(i,j_n(i)-1)$, and there are prepared one or more production program proposals in each of which one or more processable processes out of the retrieved one or more processable processes are to be executed. Then, there is calculated, for each production program proposal, a parameter comprising at least one sum total selected from the group consisting of the sum total of the production costs of the products i, the sum total of the delivery delay terms of the products i and the sum total of the system standby terms. Then, there is selected, out of the production program proposals, the production program corresponding to the optimum parameter. Thus, there can be planned a production program improved in parameter calculated by the parameter calculation means. This advantageously improves the production costs of the products, the delivery delay terms of the products, the system standby terms or the like.

According to the second production scheduling apparatus, the parameter calculation means preferably comprises means for calculating, for each of the one or more production program proposals prepared by the production program proposal preparing means, the production cost of each product i, and the production program proposal selection means preferably comprises means for calculating, for each sum total of the production costs of the products i thus calculated, an evaluation function using the following formula $$\text{(Evaluation Function)} = \alpha * \sum_{i=1}^{A} \text{(Production Cost of Product } i\text{)}$$

wherein $\alpha$ is a constant and $A$ is the number of different products.

and for selecting, as the production program, the production program proposal corresponding to the smallest evaluation function out of the calculated evaluation functions. With the arrangement above-mentioned, there can be planned a production program lowered in production cost.

In the second production scheduling apparatus, the parameter calculation means preferably comprises means for calculating, for each of the one or more production program proposals prepared by the production program proposal preparing means, the delivery delay term of each product i, and the production program proposal selection means preferably comprises means for calculating, for each sum total of the delivery delay terms of the products i thus calculated, an evaluation function using the following formula $$\text{(Evaluation Function)} = \beta * \sum_{i=1}^{A} \text{(Delivery Delay Term of Product } i\text{)}$$

wherein $\beta$ is a constant and $A$ is the number of different products.

and for selecting, as the production program, the production program proposal corresponding to the smallest evaluation function out of the calculated evaluation functions. With the arrangement above-mentioned, there can be planned a production program reduced in delivery delay.

In the second production program planning apparatus, the parameter calculation means preferably comprises means for calculating, for each of the one or more production program proposals prepared by the production program proposal preparing means, the production cost of each product i and the delivery delay term of each product i, and the production program proposal selection means preferably comprises means for calculating, for each sum total of the production costs and delivery terms of the products i thus calculated, an evaluation function using the following formula $$\text{(Evaluation Function)} = \alpha * \sum_{i=1}^{A} \text{(Production Cost of Product } i\text{)} +$$
$$\beta * \sum_{i=1}^{A} \text{(Delivery Delay Term of Product } i\text{)}$$

wherein each of $\alpha$ and $\beta$ is a constant and $A$ is the number of different products.

and for selecting, as the production program, the production program proposal corresponding to the smallest evaluation function out of the calculated evaluation functions. With the arrangement above-mentioned, there can be planned a production cost lowered in production cost and reduced in delivery delay.

In the second production scheduling apparatus, the parameter calculation means preferably comprises means for calculating, for each of the one or more production program proposals prepared by the production program proposal preparing means, the production cost of each product i, the delivery delay term of each product i and the sum of the system standby terms; and the production program proposal selection means preferably comprises means for calculating, for each sum total of the production costs of the products i, the delivery terms of the products i and the sum of the system standby terms thus calculated, an evaluation function using the following formula $$\text{(Evaluation Function)} = \alpha * \sum_{i=1}^{A} \text{(Production Cost of Product } i\text{)} +$$
$$\beta * \sum_{i=1}^{A} \text{(Delivery Delay Term of Product } i\text{)} +$$
$$\gamma * \text{(Sum Total of System Standby Terms)}$$

wherein each of $\alpha$, $\beta$ and $\gamma$ is a constant and $A$ is the number of different products.

and for selecting, as the production program, the production program proposal corresponding to the smallest evaluation function out of the calculated evaluation functions. With the arrangement above-mentioned, there can be planned a production program not only lowered in production cost but also reduced in delivery delay and system standby term.

DESCRIPTION OF THE DRAWINGS

FIG. 3 shows an example of a processable process storing table which is to be used in each of first and second production scheduling methods according to first and second embodiments of the present invention and which is to be used in each of first and second production scheduling apparatus according to the first and second embodiments of the present invention;

DETAILED DESCRIPTION OF THE INVENTION

Figure 1:
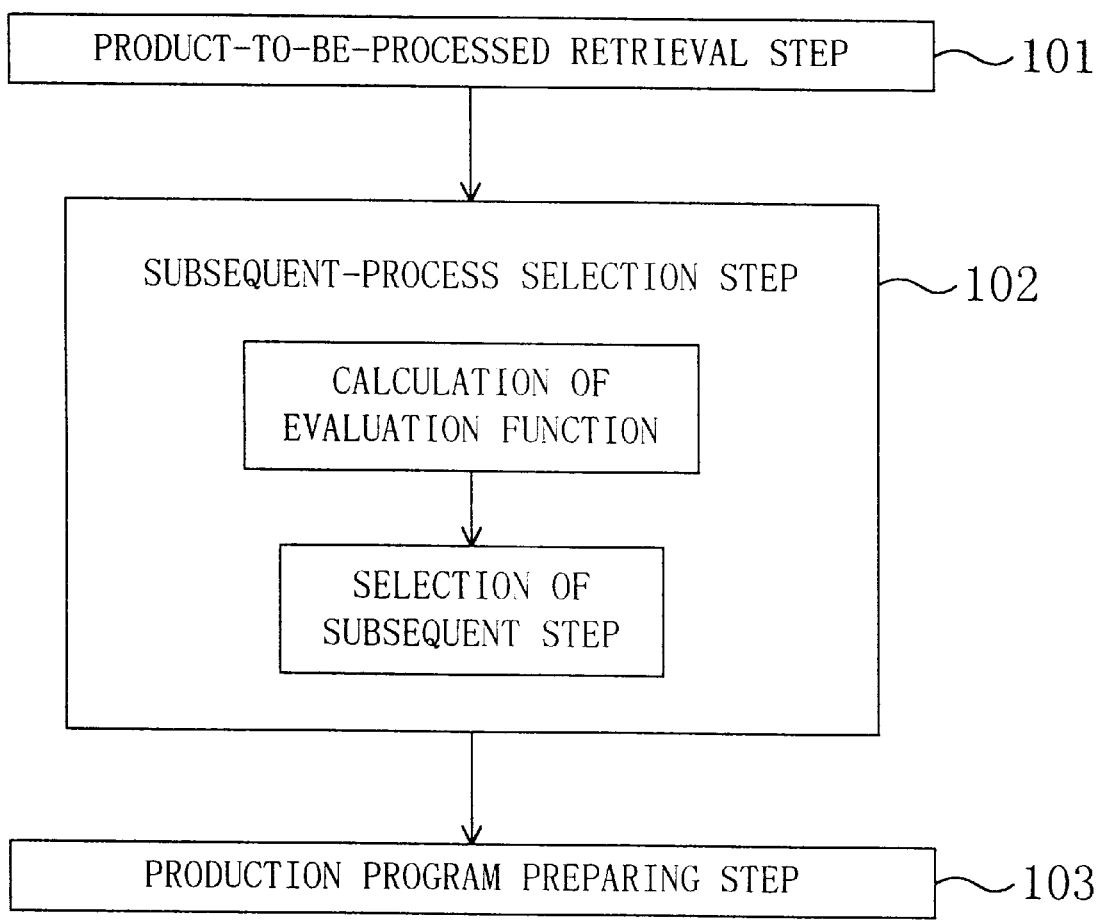
FIG. 1 is a flow chart of a first production scheduling method according to a first embodiment of the present invention.
Figure 2:
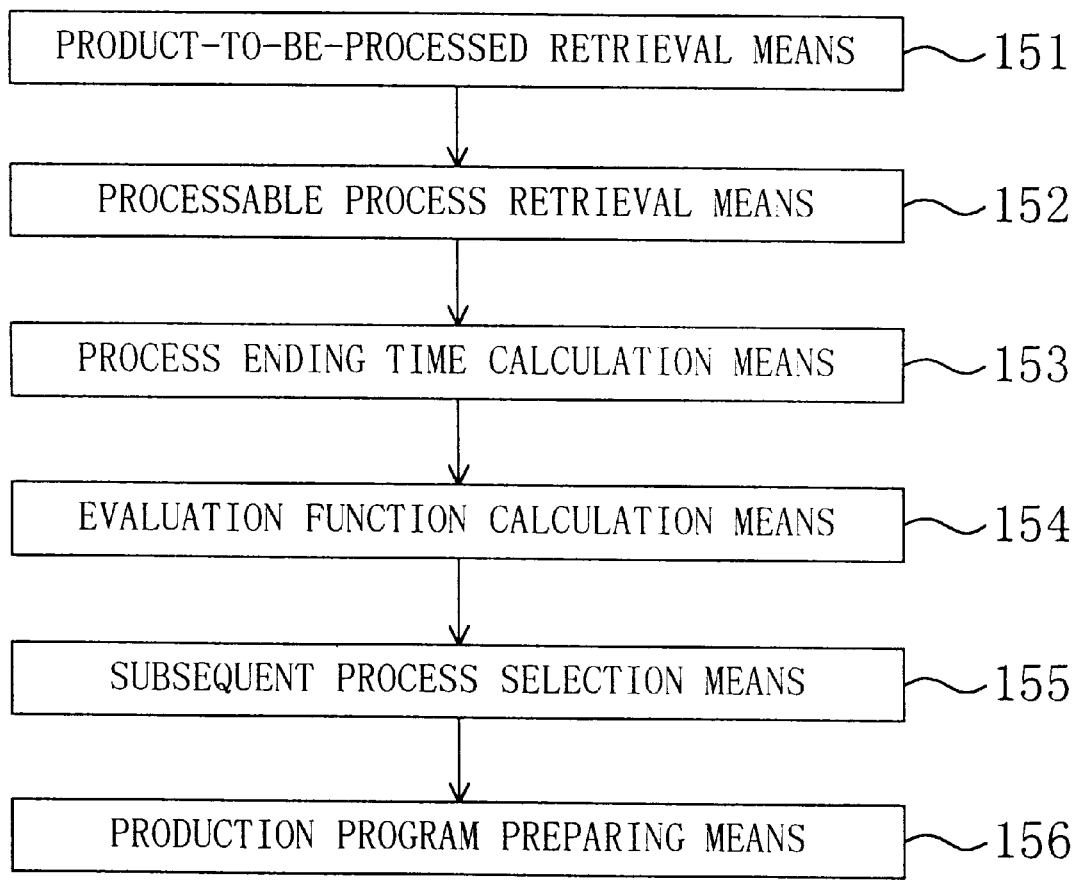
FIG. 2 is a block diagram of a first production scheduling apparatus according to the first embodiment of the present invention.

Referring to FIGS. 1 and 2, the following description will discuss the first production scheduling method and apparatus according to the first embodiment of the present invention. FIG. 1 is a flow chart of the first production scheduling method and FIG. 2 is a block diagram of the first production scheduling apparatus.

As shown in FIG. 1, the first production scheduling method comprises: a product-to-be-processed retrieval step 101 for retrieving each product which is being placed in the production line and which currently waits for a process; a subsequent-process selection step 102 for determining, for each product currently waiting for a process, each process to be subsequently executed after the execution of the process just before the process which is currently waited for; and a production program preparing step 103 for preparing a production program for executing each process determined at the subsequent-process selection step 102.

As shown in FIG. 2, the first production scheduling apparatus comprises: product-to-be-processed retrieval means 151 for retrieving each product which is being placed in the production line and which is currently waiting for a process; processable-process retrieval means 152 for retrieving, for each product currently waiting for a process, one or more processes $P(i,j_p(i))$ each of which can subsequently be executed after the execution of the process just before the process which is currently waited for; process ending time calculation means 153 for calculating the final-process ending time of each product when each of the one or more processes $P(i,j_p(i))$ retrieved by the processable-process retrieval means 152, is executed; evaluation function calculation means 154 for calculating evaluation functions at the time when one or more processes $P(i,j_n(i))$ retrieved by the processable-process retrieval means 152, are executed; subsequent-process selection means 155 for selecting the one or more processes $P(i,j_p(i))$ for which the evaluation function calculated by the evaluation function calculation means 154 is the smallest out of all the evaluation functions; and production program preparing means 156 for preparing a production program in which the one or more processes $P(i,j_n(i))$ selected by the subsequent-process selection means 155 are to be executed subsequent to one or more process $P(i,j_n(i)-1)$.

In the specification, the following abbreviations stand for the following meanings, respectively.

$P(i,j)$ stands for the jth process of each product i.

$j_n(i)$ stands for the current process No. of each product i.

Process $P(i,j_p(i))$ stands for a process which can be executed subsequent to each process $P(i,j_n(i)-1)$ (normally, such process $P(i,j_n(i))$ exists in a plural number).

$T_p(i,j)$ stands for the processing time zone of the jth process of each product i.

Tave(i,j) stands for the average process waiting period of time of a process identical with the process $P(i,j)$, as obtained from the past actual processing results (average difference between the process ending time of each process $P(i,j-1)$ and the process starting time of each process $P(i,j)$).

Ts(i,j) stands for the process starting time of each process $P(i,j)$.

Te(i,j) stands for the process ending time of each process $P(i,j)$.

Tin(i) stands for the time at which each product i is placed in the production line.

Tout(i) stands for the delivery term of each product i. "A" stands for the number of different products.

N(i) stands for the number of processes for producing each product i.

First of all, the product-to-be-processed retrieval step 101 is executed by the product-to-be-processed retrieval means 151. That is, there are retrieved the current processes $P(i', j_n(i'))$ of all the products placed in the production line, and there is retrieved, out of all the products except for each product i' for which a process is under way, each product i for which each process $P(i, j_n(i))$ has not yet been executed but for which each previous process $P(i, j_n(i)-1)$ has already been executed.

Then, the subsequent-process selection step 102 is executed by the processable-process retrieval means 152, the process ending time calculation means 153, the evaluation function calculation means 154 and the subsequent-process selection means 155. More specifically, there is determined, for each product i retrieved at the product-to-be-processed retrieval step 101, each process to be executed subsequent to each process $P(i,j_n(i)-1)$. The following description will discuss in detail the subsequent-process selection step 102.

FIG. 3 shows an example of a processable-process storing table containing the name of each process $P(i, j_p(i))$ which can be executed subsequent to each process $P(i,j_n(i)-1)$.

First, for each product i retrieved at the product-to-be-processed retrieval step 101, the processable-process retrieval means 152 retrieves, from the process-able-process storing table, one or more processes $P(i, j_p(i))$ each of which can be executed after the execution of each process $P(i, j_n(i)-1)$.

Then, the process ending time calculation means 153 calculates, for each product i, the process ending time Te(i, N(i)) when each of the one or more processes $P(i, j_p(i))$ retrieved by the processable-process retrieval means 152, is executed subsequent to each process $P(i, j_n(i)-1)$.

Figure 4:
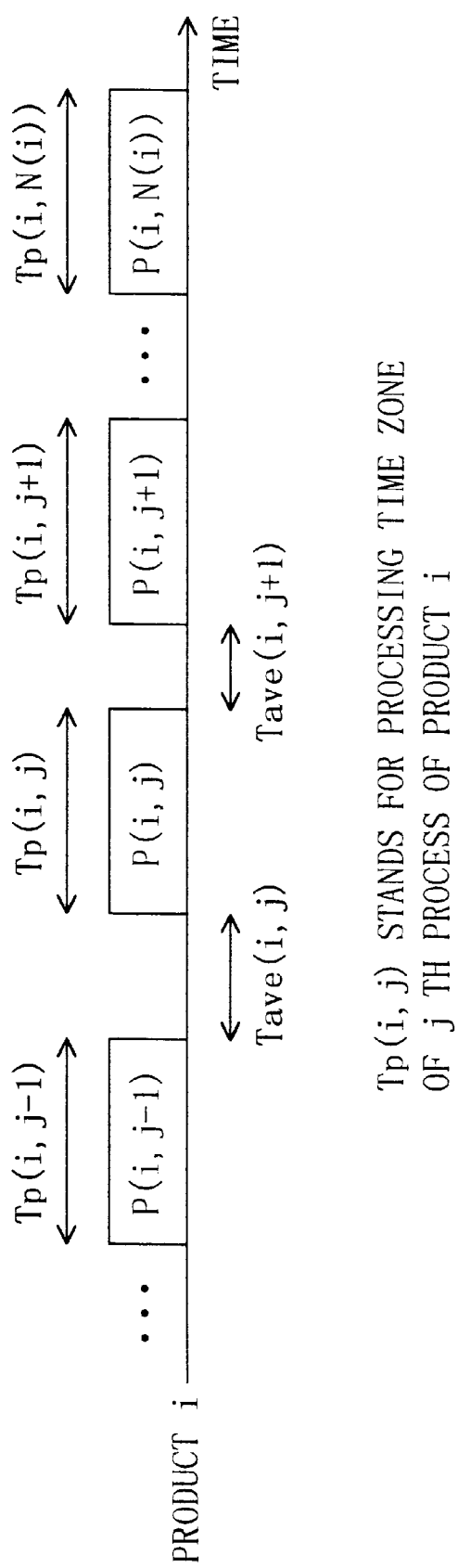
FIG. 4 is a view illustrating a method of obtaining the final process ending time of each product in the first production scheduling method and apparatus according to the first embodiment of the present invention.

Referring to FIG. 4, the following description will discuss an example of a method of obtaining the process ending time Te(i, N(i)) of each product i.

FIG. 4 shows a time chart illustrating a method of obtaining the process ending time Te(i, N(i)) of each product i. In FIG. 4, the axis of abscissa presents time.

First, the average process waiting period of time Tave(i,j) is obtained, from the past actual processing results, for each process not yet executed on each product i, and the process ending time Te(i, N(i)) of the final process of each product i is obtained, with the process starting time Ts(i,j) of each process $P(i,j)$ set to $\{Te(i,j-1)+Tave(i,j)\}$, using the following formula (1):

$$Te(i, N(i)) = Tin(i) + \sum_{j=1}^{N(i)} \{Tave(i, j) + Tp(i, j)\} \quad (1)$$

Then, using the process ending time Te(i, N(i)) of the final process of each product i obtained according to the formula (1), the evaluation function calculation means 154 calculates each evaluation function defined according to the following formula (2):

$$(\text{Evaluation Function}) = \alpha * \sum_{i=1}^{A} (\text{Production Cost of Product } i) + \quad (2)$$

$$\beta * \sum_{i=1}^{A} (\text{Delivery Delay Term of Product } i)$$

wherein (Production Cost of Product $i$) =

$$\left(2 - \frac{\text{Estimated Yield of Product } i}{100}\right) *$$

$$\sum_{j=jp(i)}^{N(i)} (\text{Processing Cost of Process } P(i, j) +$$

-continued $$\sum_{j=1}^{jn(i)} (\text{Processing Cost of Process } P(i, j))$$

(Estimated Yield of Product $i$) = (Process Yield of Process $P(i, n-1)) * \sum (\text{Average Process Yield of Process } P(i, j)$ (Delivery Delay Term of Product $i$) =

$Te(i, N(i)) - (\text{Delivery Term of Product } i)$

The average process yield of each process P(i,j) refers to the average process yield of a process identical with the process P(i,j), as calculated from the past actual processing results. The processing cost of each process P(i,j) refers to the cost of the raw materials and the like to be used for executing the process P(i,j). Each of $\alpha$ and $\beta$ is a suitable constant.

The estimated yield of each product i may be obtained using other calculation formula than that abovementioned.

Then, the subsequent-process selection means 155 selects, as one or more processes to be executed subsequent to the process $P(i,j_n(i)-1)$, the one or more processes $P(i,j_p(i))$ for which the calculated evaluation function is the smallest out of the calculated evaluation functions. Thus, the subsequent-process selection step 102 is completed.

Then, the production program preparing means 156 executes the production program preparing step 103. That is, there is prepared a production program in which the one or more processes $P(i, j_p(i))$ selected at the subsequent-process selection step 102 are to be executed subsequent to one or more processes $P(i, j_n(i)-1)$.

According to the first production scheduling method and apparatus, there is determined each process to be executed subsequent to each process $P(i, j_n(i)-1)$, using the formula (2) in which the production cost and delivery delay term of each product i are being taken into consideration. It is therefore possible to prepare a production program which achieves a production low in production cost and short in delivery delay term. Further, in the formula (2), the production cost is calculated based on the yield. Thus, there can be prepared a production program increased in yield.

When it is intended to determine, by comparison of the production cost only, each process $P(i,j_p(i))$ to be executed subsequent to the process $P(i,j_n(i)-1)$, the formula (2) may be used with the second term deleted or with $\beta$ therein set to 0. In such a case, it is not required to calculate, at the subsequent-process selection step 102, the process ending time Te(i, N(i)) of each product in the production line, thus eliminating the process ending time calculation means 153.

When it is intended to determine, by comparison of the delivery delay term only, each process $P(i,j_p(i))$ to be executed subsequent to the process $P(i,j_n(i)-1)$, the formula (2) may be used with the first term deleted or with a therein set to 0.

Figure 5:
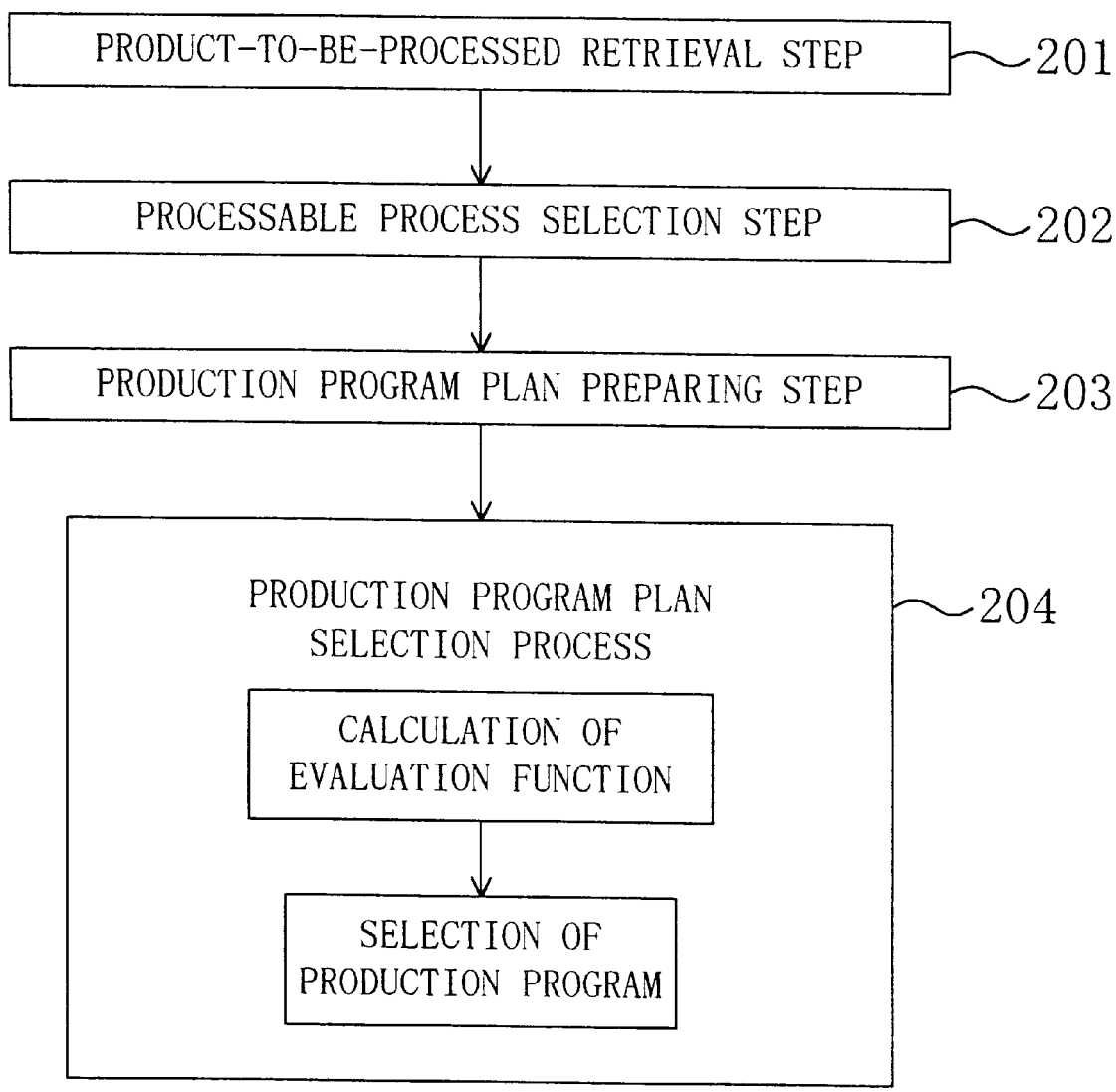
FIG. 5 is a flow chart of the second production scheduling method according to the second embodiment of the present invention.
Figure 6:
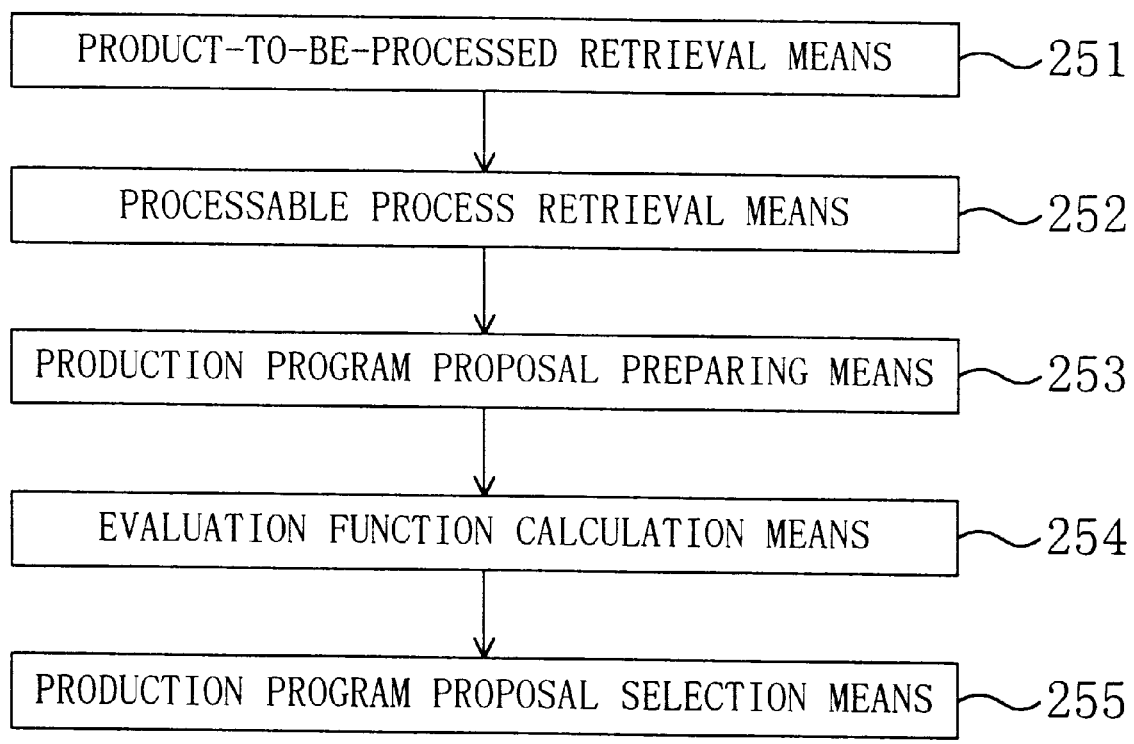
FIG. 6 is a block diagram of the second production scheduling apparatus according to the second embodiment of the present invention.

Referring to FIGS. 5 and 6, the following description will discuss the second production scheduling method and apparatus according to the second embodiment of the present invention. FIG. 5 is a flow chart of the second production scheduling method and FIG. 6 is a block diagram of the second production scheduling apparatus.

As shown in FIG. 5, the second production scheduling method comprises: a product-to-be-processed retrieval step 201 of retrieving each product which is being placed in the production line and which is currently waiting for a process: a processable-process retrieval step 202 of retrieving, for each retrieved product currently waiting for a process, one or more processes each of which can be executed after the execution of the process just before the process which is currently waited for; a production program proposal preparing step 203 of preparing one or more production program proposals in each of which one or more processes retrieved at the processable-process retrieval step 202 are to be executed; and a production program proposal selection step 204 of selecting the optimum production program proposal out of the one or more production program proposals prepared at the production program proposal preparing step 203.

As shown in FIG. 6, the second production scheduling apparatus comprises: product-to-be-processed retrieval means 251 for retrieving each product which is being placed in the production line and which is currently waiting for a process; processable-process retrieval means 252 for retrieving, for each retrieved product currently waiting for a process, one or more processes each of which can subsequently be executed after the execution of the process just before the process which is currently waited for; production program proposal preparing means 253 for preparing one or more production program proposals in each of which one or more processes retrieved by the processable-process retrieval means 252 are to be executed; evaluation function calculation means 254 for calculating a predetermined evaluation function for each of the one or more production program proposals prepared by the production program proposal preparing means 253; and production program proposal selection means 255 for selecting the production program proposal for which the evaluation function calculated by the evaluation function calculation means 254 is the smallest out of all the calculated evaluation functions.

First of all, the product-to-be-processed retrieval step 201 is executed by the product-to-be-processed retrieval means 251. That is, there are retrieved the current processes $P(i', j_n(i'))$ of all the products placed in the production line, and there is retrieved, out of all the products except for each product i' for which a process is under way, each product i for which each process $P(i', j_n(i))$ has not yet been executed but for which each previous process $P(i, j_n(i)-1)$ has already been executed.

Then, the processable-process retrieval step 202 is executed by the processable-process retrieval means 252. More specifically, using the processable-process storing table in FIG. 2, there are retrieved, for each product i retrieved at the product-to-be-processed retrieval step 201, one or more processes $P(i, j_p(i))$ each of which can be executed subsequent to each process $P(i, j_n(i)-1)$.

Then, the production program proposal preparing step 203 is executed by the production program proposal preparing means 253. More specifically, there are prepared, for each product i retrieved at the product-to-be-processed retrieval step 201, one or more production program proposals in each of which one or more processes $P(i, j_p(i))$ retrieved at the processable-process retrieval step 202 are to be executed after each process $P(i, j_n(i)-1)$.

Then, the production program proposal selection step 204 is executed by the evaluation function calculation means 254 and the production program proposal selection means 255. More specifically, there is selected the optimum production program proposal out of the one or more production program proposals prepared at the production program proposal preparing step 203. The following description will discuss in detail the production program proposal selection step 204.

First, the evaluation function calculation means 254 calculates, for each of the one or more production program proposals prepared at production program proposal preparing step 203, an evaluation function defined by the following formula (3):

$$\text{(Evaluation Function)} = \alpha * \sum_{i=1}^{A} \text{(Production Cost of Product } i\text{)} + \quad (3)$$

$$\beta * \sum_{i=1}^{A} \text{(Delivery Delay Term of Product } i\text{)} +$$

$$\gamma * \sum_{i=1}^{A} \sum_{j=1}^{N(j)} \text{(System Standby Term at Process } P(i, j)$$

wherein (Production Cost of Product $i$) =

$$\left(2 - \frac{\text{Estimated Yield of Product } i}{100}\right) *$$

$$\sum_{j=jp(i)}^{N(i)} \text{(Processing Cost of Process } P(i, j) +$$

$$\sum_{j=1}^{jn(i)} \text{(Processing Cost of Process } P(i, j)$$

(Estimated Yield of Product $i$) = (Process Yield of Process $$P(i, n-1)) * \sum \text{(Average Process Yield of Process } P(i, j)$$

(Delivery Delay Term of Product $i$) =

$$Te(i, N(i)) - \text{(Delivery Term of Product } i)$$

The average process yield of each process P(i,j) refers to the average process yield of a process identical with the process P(i,j), as calculated from the past actual processing results. The processing cost of each process P(i,j) refers to the cost of the raw materials and the like to be used for executing the process P(i,j). The system standby term of each process P(i,j) refers to (a) a term during which, in order to bring the processing waiting period of time of the process P(i,j) to zero when there is a product i hastened in delivery term, the system used for executing the process P(i,j) can wait without executing any process until the product i arrives, or (b) a term during which, in order to enhance the system working ratio by shortening the term where the system is inactive, the system is ready for execution of the process P(i,j) and waits for the arrival of each product i. Each of α, β and γ is an optional constant.

The estimated yield of each product i may be obtained using other calculation formula than that above-mentioned.

Then, the production program proposal selection means 255 selects, as the final production program, the production program proposal for which the evaluation function is the smallest in the calculated evaluation functions. Thus, the production program proposal selection step 204 is completed.

According to the second production scheduling method and apparatus, each process to be executed subsequent to each process P(i, $j_n(i)_{31}$ 1) is determined based on the value obtained using the formula (3) in which the production cost, the delivery delay term and the system standby term are being taken into consideration. It is therefore possible to prepare a production program low in production cost, short in delivery delay term and high in system working ratio. Further, in the formula (3), the production cost is calculated based on the yield. Thus, there can be prepared a production program increased in yield.

The calculation formula of the production cost of each product i shown in each of the formula (2) and formula (3), is a mere example, and the production cost of each product i may be calculated using other calculation formula.

When it is intended to select, at the production program proposal selection step 204, the optimum production program proposal by comparison of the production cost only, the formula (2) may be used with the second and third terms therein deleted or with β and γ therein set to 0. When it is intended to select the optimum production program proposal by comparison of the delivery delay term only, the formula (2) may be used with the first and third terms therein deleted or with a and γ therein set to 0.

I claim:

1. A production scheduling method comprising:

a product-to-be-processed retrieval step of retrieving, out of the products placed in the production line, each product for which the $j_n(i)$th process of each product i, i.e., each process P(i, $j_n(i)$), has not yet been executed but for which each process P(i, $j_n(i)-1$) serving as the previous process of each process P(i, $j_n(i)$), has been executed;

a subsequent-process selection step of (i) retrieving, for said each product retrieved at said product-to-be-processed retrieval step, one or more processable processes each of which can be executed subsequent to said process P(i, $j_n(i)-1$), (ii) calculating parameters at the time when there are executed, subsequent to the process P(i, $j_n(i)-1$), one or more processes out of said retrieved one or more processable processes, each of said parameters comprising at least one sum total selected from the group consisting of the sum total of the production costs of the products i and the sum total of the delivery delay terms of the products i, and (iii) selecting, as one or more subsequent processes, the one or more processable processes corresponding to the optimum parameter out of said calculated parameters; and a production program preparing step of preparing a production program for executing, subsequent to each process P(i, $j_n(i)-1$), each of said one or more processable processes selected by said subsequent-process selection step.

2. A production scheduling method according to claim 1, wherein said subsequent-process selection step comprises the steps of:

retrieving, for said each product retrieved at said product-to-be-processed retrieval step, one or more processable processes each of which can be executed subsequent to each process P(i, $j_n(i)-1$);

calculating the production cost of each product i when each of said retrieved one or more processable processes is executed subsequent to said process P(i, calculating, for each sum total of the production costs of the products i thus calculated, an evaluation function using the following formula $$\text{(Evaluation Function)} = \alpha * \sum_{i=1}^{A} \text{(Production Cost of Product } i\text{)}$$

wherein $\alpha$ is a constant and $A$ is the number of different products.

and selecting, as one or more subsequent processes, the one or more processable processes corresponding to the smallest evaluation function out of said calculated evaluation functions.

3. A production scheduling method according to claim 1, wherein said subsequent-process selection step comprises the steps of:

retrieving, for said each product retrieved at said product-to-be-processed retrieval step, one or more processable processes each of which can be executed subsequent to said process $P(i, j_n(i)-1)$;

calculating the delivery delay term of each product i when each of said retrieved one or more processable processes is executed subsequent to said process $P(i$, calculating, for each sum total of the delivery delay terms of the products i thus calculated, an evaluation function using the following formula $$\text{(Evaluation Function)} = \beta * \sum_{i=1}^{A} \text{(Delivery Delay Term of Product } i\text{)}$$

wherein $\beta$ is a constant and $A$ is the number of different products.

and selecting, as one or more subsequent processes, the one or more processable processes corresponding to the smallest evaluation function out of said calculated evaluation functions.

4. A production scheduling method according to claim 1, wherein said subsequent-process selection step comprises the steps of:

retrieving, for said each product retrieved at said product-to-be-processed retrieval step, one or more processable processes each of which can be executed subsequent to said process $P(i, j_n(i)-1)$;

calculating the sum totals of the production costs of the products i and the sum totals of the delivery delay terms of the products i at the time when one or more processes out of said retrieved one or more processable processes are executed subsequent to said process $P(i, j_n(i)-1$;

calculating, for each sum of production costs and delivery terms of the products i thus calculated, an evaluation function using the following formula $$\text{(Evaluation Function)} = \alpha * \sum_{i=1}^{A} \text{(Production Cost of Product } i\text{)} +$$

$$\beta * \sum_{i=1}^{A} \text{(Delivery Delay Term of Product } i\text{)}$$

wherein each of $\alpha$ and $\beta$ is a constant and $A$ is the number of different products.

and selecting, as one or more subsequent processes, the one or more processable processes corresponding to the smallest evaluation function out of said calculated evaluation functions.

5. A production scheduling method comprising:

a product-to-be-processed retrieval step of retrieving, out of the products placed in the production line, each product for which the $j_n(i)$th process of each product i, i.e., each process $P(i, j_n(i))$, has not yet been executed but for which each process $P(i, j_n(i)_{31} 1)$ serving as the previous process of each process $P(i, j_n(i))$, has been executed;

a processable-process retrieval step of retrieving, for said each product retrieved at said product-to-be-processed retrieval step, one or more processable processes each of which can be executed subsequent to said process $P(i, j_n(i)-1)$;

a production program proposal preparing step of preparing one or more production program proposals in each of which one or more processes out of said one or more processable processes retrieved at said processable-process retrieval step are to be executed; and a production program proposal selection step of (i) calculating, for each of said one or more production program proposals prepared at said production program proposal preparing step, a parameter comprising at least one sum total selected from the group consisting of the sum total of the production costs of the products i, the sum total of the delivery delay terms of the products i and the sum total of the system standby terms, and (ii) selecting, as the production program, the production program proposal corresponding to the optimum parameter out of said calculated parameters.

6. A production scheduling method according to claim 5, wherein said production program proposal selection step comprises the steps of:

calculating, for each of said one or more production program proposals prepared at said production program proposal preparing step, the production cost of each product i;

calculating, for each sum total of the production costs of the products i thus calculated, an evaluation function using the following formula $$\text{(Evaluation Function)} = \alpha * \sum_{i=1}^{A} \text{(Production Cost of Product } i\text{)}$$

wherein $\alpha$ is a constant and $A$ is the number of different products.

and selecting, as the production program, the production program proposal corresponding to the smallest evaluation function out of said calculated evaluation functions.

7. A production scheduling method according to claim 5, wherein said production program proposal selection step comprises the steps of:

calculating, for each of said one or more production program proposals prepared at said production program proposal preparing step, the delivery delay term of each product i;

calculating, for each sum total of the delivery terms of the products i thus calculated, an evaluation function using the following formula $$\text{(Evaluation Function)} = \beta * \sum_{i=1}^{A} \text{(Delivery Delay Term of Product } i\text{)}$$

wherein $\beta$ is a constant and $A$ is the number of different products.

and selecting, as the production program, the production program proposal corresponding to the smallest evaluation function out of said calculated evaluation functions.

8. A production scheduling method according to claim 5, wherein said production program proposal selection step comprises the steps of:

calculating, for each of said one or more production program proposals prepared at said production program proposal preparing step, the production cost of each product i and the delivery delay term of each product i;

calculating, for each sum total of the production costs and delivery terms of the products i thus calculated, an evaluation function using the following formula $$(\text{Evaluation Function}) = \alpha * \sum_{i=1}^{A} (\text{Production Cost of Product } i) +$$

$$\beta * \sum_{i=1}^{A} (\text{Delivery Delay Term of Product } i)$$

wherein each of $\alpha$ and $\beta$ is a constant and A is the number of different products.

and selecting, as the production program, the production program proposal corresponding to the smallest evaluation function out of said calculated evaluation functions.

9. A production scheduling method according to claim 5, wherein said production program proposal selection step comprises the steps of:

calculating, for each of said one or more production program proposals prepared at said production program proposal preparing step, the production cost of each product i, the delivery delay term of each product i and the sum of the system standby terms;

calculating, for each sum total of the production costs of the products i, the delivery terms of the products i and the sum of the system standby terms thus calculated, an evaluation function using the following formula $$(\text{Evaluation Function}) = \alpha * \sum_{i=1}^{A} (\text{Production Cost of Product } i) +$$

$$\beta * \sum_{i=1}^{A} (\text{Delivery Delay Term of Product } i) +$$

$$\gamma * (\text{Sum Total of System Standby Terms})$$

wherein each of $\alpha$, $\beta$ and $\gamma$ is a constant and A is the number of different products.

and selecting, as the production program, the production program proposal corresponding to the smallest evaluation function out of said calculated evaluation functions.

10. A production scheduling apparatus comprising:

product-to-be-processed retrieval means for retrieving, out of the products placed in the production line, each product for which the $j_n(i)$th process of each product i, i.e., each process $P(i, j_n(i))$, has not yet been executed but for which each process $P(i, j_n(i)-1)$ serving as the previous process of each process $P(i, j_n(i))$, has been executed;

processable-process retrieval means for retrieving, for said each product retrieved by said product-to-be-processed retrieval means, one or more processable processes each of which can be executed subsequent to said process $P(i, j_n(i)-1)$;

parameter calculation means for calculating parameters at the time when there are executed, subsequent to said process $P(i, j_n(i)-1)$, one or more processes out of said retrieved one or more processable processes, each of said parameters comprising at least one sum total selected from the group consisting of the sum total of the production costs of the products i and the sum total of the delivery delay terms of the products i;

subsequent-process selection means for selecting, as one or more subsequent processes, the one or more processable processes corresponding to the optimum parameter out of said parameters calculated by said parameter calculation means; and production program preparing means for preparing a production program for executing, subsequent to each process $P(i, j_n(i)-1)$, each of said one or more processable processes selected by said subsequent-process selection means.

11. A production scheduling apparatus according to claim 10, wherein:

said parameter calculation means comprises means for calculating the production cost of each product i when each of said one or more processable processes retrieved by said processable-process retrieval means is executed subsequent to said process $P(i, j_n(i)-1)$; and said subsequent-process selection means comprises means for calculating, for each sum total of the production costs of the products i thus calculated, an evaluation function using the following formula $$(\text{Evaluation Function}) = \alpha * \sum_{i=1}^{A} (\text{Production Cost of Product } i)$$

wherein $\alpha$ is a constant and A is the number of different products.

and for selecting, as one or more subsequent processes, the one or more processable processes corresponding to the smallest evaluation function out of said calculated evaluation functions.

12. A production program planning apparatus according to claim 10, wherein said parameter calculation means comprises means for calculating the delivery delay term of each product i when each of said one or more processable processes retrieved by said processable-process retrieval means is executed subsequent to said process $P(i, j_n(i)-1)$; and said subsequent-process selection means comprises means for calculating, for each sum total of the delivery delay terms of the products i thus calculated, an evaluation function using the following formula $$(\text{Evaluation Function}) = \beta * \sum_{i=1}^{A} (\text{Delivery Delay Term of Product } i)$$

wherein $\beta$ is a constant and A is the number of different products.

and for selecting, as one or more subsequent processes, the one or more processable processes corresponding to the smallest evaluation function out of said calculated evaluation functions.

13. A production scheduling apparatus according to claim 10, wherein:

said parameter calculation means comprises means for calculating the production cost of each product i and the delivery delay term of each product i at the time when each of said one or more processable processes retrieved by said processable-process retrieval means is executed subsequent to said process $P(i, j_n(i)-1)$; and said subsequent-process selection means comprises means for calculating, for each sum total of the production costs and delivery delay terms of the products i thus calculated, an evaluation function using the following formula $$\text{(Evaluation Function)} = \alpha * \sum_{i=1}^{A} \text{(Production Cost of Product } i\text{)} + \beta * \sum_{i=1}^{A} \text{(Delivery Delay Term of Product } i\text{)}$$

wherein each of α and β is a constant and A is the number of different products.

and for selecting, as one or more subsequent processes, the one or more processable processes corresponding to the smallest evaluation function out of said calculated evaluation functions.

14. A production scheduling apparatus comprising:

product-to-be-processed retrieval means for retrieving, out of the products placed in the production line, each product for which the $j_n(i)$th process of each product i, i.e., each process $P(i, j_n(i))$, has not yet been executed but for which each process $P(i, j_n(i)-1)$ serving as the previous process of each process $P(i, j_n(i))$, has been executed;

processable-process retrieval means for retrieving, for said each product retrieved by said product-to-be-processed retrieval means, one or more processable processes each of which can be executed subsequent to said process $P(i, j_n(i)-1)$;

production program proposal preparing means for preparing one or more production program proposals in each of which one or more processes out of said one or more processable processes retrieved by said processable-process retrieval means are to be executed;

parameter calculation means for calculating, for each of said one or more production program proposals prepared by said production program proposal preparing means, a parameter comprising at least one sum total selected from the group consisting of the sum total of the production costs of the products i, the sum total of the delivery delay terms of the products i and the sum total of the system standby terms; and production program proposal selection means for selecting, as the production program, the production program proposal corresponding to the optimum parameter out of said parameters calculated by said parameter calculation means.

15. A production scheduling planning apparatus according to claim 14, wherein:

said parameter calculation means comprises means for calculating, for each of said one or more production program proposals prepared by said production program proposal preparing means, the production cost of each product i; and said production program proposal selection means comprises means for calculating, for each sum total of the production costs of the products i thus calculated, an evaluation function using the following formula $$\text{(Evaluation Function)} = \alpha * \sum_{i=1}^{A} \text{(Production Cost of Product } i\text{)}$$

wherein α is a constant and A is the number of different products.

and for selecting, as the production program, the production program proposal corresponding to the smallest evaluation function out of said calculated evaluation functions.

16. A production scheduling apparatus according to claim 14, wherein:

said parameter calculation means comprises means for calculating, for each of said one or more production program proposals prepared by said production program proposal preparing means, the delivery delay term of each product i; and said production program proposal selection means comprises means for calculating, for each sum total of the delivery delay terms of the products i thus calculated, an evaluation function using the following formula $$\text{(Evaluation Function)} = \beta * \sum_{i=1}^{A} \text{(Delivery Delay Term of Product } i\text{)}$$

wherein β is a constant and A is the number of different products.

and for selecting, as the production program, the production program proposal corresponding to the smallest evaluation function out of said calculated evaluation functions.

17. A production scheduling planning apparatus according to claim 14, wherein:

said parameter calculation means comprises means for calculating, for each of said one or more production program proposals prepared by said production program proposal preparing means, the production cost of each product i and the delivery delay term of each product i; and said production program proposal selection means comprises means for calculating, for each sum total of the production costs and delivery terms of the products i thus calculated, an evaluation function using the following formula $$\text{(Evaluation Function)} = \alpha * \sum_{i=1}^{A} \text{(Production Cost of Product } i\text{)} + \beta * \sum_{i=1}^{A} \text{(Delivery Delay Term of Product } i\text{)}$$

wherein each of α and β is a constant and A is the number of different products.

and for selecting, as the production program, the production program proposal corresponding to the smallest evaluation function out of said calculated evaluation functions.

18. A production scheduling apparatus according to claim 14, wherein:

said parameter calculation means comprises means for calculating, for each of said one or more production program proposals prepared by said production program preparing means, the production cost of each product i, the delivery delay term of each product i and the sum of the system standby terms; and said production program proposal selection means comprises means for calculating, for each sum total of the production costs of the products i, the delivery terms of the products i and the sum of the system standby terms thus calculated, an evaluation function using the following formula $$(\text{Evaluation Function}) = \alpha * \sum_{i=1}^{A} (\text{Production Cost of Product } i) +$$

$$\beta * \sum_{i=1}^{A} (\text{Delivery Delay Term of Product } i) +$$

-continued $$\gamma * (\text{Sum Total of System Standby Terms})$$

wherein each of $\alpha$, $\beta$ and $\gamma$ is a constant and A is the number of different products.

and for selecting, as the production program, the production program proposal corresponding to the smallest evaluation function out of said calculated evaluation functions.

* * * * *

UNITED STATES PATENT AND TRADEMARK OFFICE
CERTIFICATE OF CORRECTION

PATENT NO. : 5,953,711
DATED : September 14, 1999
INVENTOR(S) : Ishizuka

It is certified that error appears in the above-identified patent and that said Letters Patent is hereby corrected as shown below:

In the claims:

Claim 2, line 10, change "P(i," to --P(i, $j_n(i)-1$);--.

Claim 3, line 10, change "P(i," to --P(i, $j_n(i)-1$);--.

Claim 5, line 6, change "P(i,$j_n(i)_{31}1$)" to --P(i, $j_n(i)-1$);--.

Signed and Sealed this

Fifteenth Day of August, 2000

Attest:

Q. TODD DICKINSON

*Attesting Officer*          *Director of Patents and Trademarks*